United States Patent
Soo et al.

(10) Patent No.: US 12,489,855 B2
(45) Date of Patent: Dec. 2, 2025

(54) MEDIA POSITION DETERMINATION BASED ON IMAGES OF PATTERNS CAPTURED BY IMAGING SENSORS

(71) Applicant: Hewlett-Packard Development Company, L.P., Spring, TX (US)

(72) Inventors: Sai Horng Soo, Singapore (SG); Ginu Jacob, Singapore (SG); Siew Hong Lam, Singapore (SG); Chin Hung Andy Koh, Singapore (SG); Biyun Phoa, Singapore (SG); Ganlin Tang, Singapore (SG); Shyh Chije Leong, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 219 days.

(21) Appl. No.: 18/563,152

(22) PCT Filed: May 26, 2021

(86) PCT No.: PCT/US2021/034321
§ 371 (c)(1),
(2) Date: Nov. 21, 2023

(87) PCT Pub. No.: WO2022/250667
PCT Pub. Date: Dec. 1, 2022

(65) Prior Publication Data
US 2024/0283879 A1    Aug. 22, 2024

(51) Int. Cl.
*H04N 1/04*    (2006.01)
*H04N 1/00*    (2006.01)

(52) U.S. Cl.
CPC ..... *H04N 1/00702* (2013.01); *H04N 1/00734* (2013.01); *H04N 1/00745* (2013.01); *H04N 1/00761* (2013.01); *H04N 1/00782* (2013.01)

(58) Field of Classification Search
USPC ........................................ 358/1.15, 488, 496
See application file for complete search history.

(56) References Cited

U.S. PATENT DOCUMENTS 6,134,027 A * 10/2000 Lee ........................ G01B 11/02
399/376
6,198,088 B1 * 3/2001 Seachman .......... H04N 1/00702
399/380

(Continued)

FOREIGN PATENT DOCUMENTS

JP    2011-205274 A    10/2011

*Primary Examiner* — Cheukfan Lee
(74) *Attorney, Agent, or Firm* — Brooks, Cameron & Huebsch, PLLC (57) ABSTRACT

According to examples, an apparatus may include a processor and a memory on which are stored computer-readable instructions that, when executed by the processor, may cause the processor to identify first property values along an image of a pattern. The first property values may be identified based on a first signal corresponding to an image of the pattern captured by an imaging sensor. The pattern may be positioned at a spaced relation with respect to the imaging sensor. The processor may receive a second signal corresponding to a second image captured by the imaging sensor, and may identify, from the second signal, second property values along the second image. Based on a determination that the second property values differ from the first property values, the processor may determine that a beginning of a media is positioned to be imaged by the imaging sensor.

15 Claims, 7 Drawing Sheets

(56) References Cited

U.S. PATENT DOCUMENTS

| | | |
|---|---|---|
| 2007/0188830 A1 | 8/2007 | Watanuki |
| 2008/0298860 A1 | 12/2008 | Omata |
| 2009/0316172 A1 | 12/2009 | Tanimoto |
| 2011/0194160 A1 | 8/2011 | Maki |
| 2012/0201552 A1 | 8/2012 | Hirai et al. |

* cited by examiner

MEDIA POSITION DETERMINATION BASED ON IMAGES OF PATTERNS CAPTURED BY IMAGING SENSORS

BACKGROUND

During scanning operations, automatic document feeders (ADFs) may feed media past imaging sensors. As the media is moved across the imaging sensors, the imaging sensors may capture images of content on the media.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, scanners may have a mechanism, such as automatic document feeders (ADFs), to feed media through the scanners. The scanners may be implemented to detect positions of the media as the media is being fed through the scanners. In some scanners, dedicated hardware components may be implemented to detect the positions of media. For instance, hardware components such as optical sensors, PCBs, connectors, harnesses, ferrite cores, and the like may be used in some scanners. However, concerns associated with such hardware-based systems may be relatively high costs associated with the hardware components, including maintenance and replacement costs.

In other examples, the imaging sensors of the scanner may be used to detect the positions of the media, in lieu of the hardware components. However, such implementations may be based on capturing images of components of the scanner, rather than a dedicated pattern for use in media detection, and analyzing properties of the corresponding signal. For instance, such implementations may capture an image of a surface of an automatic document feeder (ADF), and may analyze properties found in the resulting image to make media presence determinations. Concerns associated with such implementations may be that, in some instances, they may be limited to color scans, and as such, detection may be limited to analysis of color parameters such as chroma. These implementations may also have reduced edge detection reliability because accuracy of media detection may be sensitive to the scanner module and the media type. In some instances, these implementations may be limited to certain types of media, such as plain, non-glossy paper, may be sensitive to content of the page being scanned, may require manual tuning of firmware for different media types and scanner modules, and/or the like.

Disclosed herein are apparatuses, systems, methods, and computer-readable media in which an image of a pattern captured by an imaging sensor may be used to determine a position of media in a scanner. By way of particular example and for purposes of illustration, a pattern may be specific arrangement of printed features having specific CIE $L^*a^*b^*$ values, which may be implemented as a sticker. The pattern may be applied to a surface of the scanner, for instance on a white background surface of an ADF that faces an imaging sensor, so that the imaging sensor of the scanner may capture an image of the pattern. The processor may analyze incoming images from the imaging sensor to determine presence of the features in the received images. When the media reaches the imaging sensor, the features of the pattern may be blocked, in which case the processor may make a determination on a position of the media, for instance, that a beginning of the media may be positioned to be scanned by the imaging sensor.

In some examples, the processor may receive a first signal corresponding to an image of a pattern captured by an imaging sensor. The pattern may be positioned at a spaced relation with respect to the imaging sensor. The processor may identify first property values from the first signal along the image of the pattern. In some examples, the processor may identify peak values of the first property values, such as peak grey levels which may correlate to presence of features of the pattern in the captured image. The processor may receive a second signal corresponding to a second image captured by the imaging sensor and may identify, from the second signal, second property values in the second signal, along the second image. The identified second property values may be peak values of the second property values. The processor may determine whether the second property values differ from the first property values, which may indicate that the media is covering the image. In some examples, the processor may determine that the media or a portion of the media, such as a beginning portion or an end portion of the media, is positioned to be imaged by the imaging sensor.

By enabling detection of media using signals corresponding to an image of a pattern captured by an imaging sensor, the disclosed apparatuses, systems, methods, and computer-readable media may reduce costs associated with hardware components that may be dedicated to detect media presence. In some examples, the apparatus may prolong the life of the system by allowing removal of hardware components which may potentially fail, and at no additional costs for replacement of the hardware components that may be removed.

Additionally, when compared to implementations that use an imaging sensor to detect page edges, the apparatuses of the present disclosure may have several benefits including having relatively less limitations on supported scan modes, improved accuracy of page detection, relatively greater number of supported media types, relatively less dependency on document content, a relatively shorter firmware development time, improved power-up paper jam clearing, and/or the like. By improving the performance of page detection as described herein, the apparatuses of the present disclosure may reduce print media and energy consumption by reducing a number of defective scan/print jobs that may be caused by inaccurate detection of media.

Figure 1:
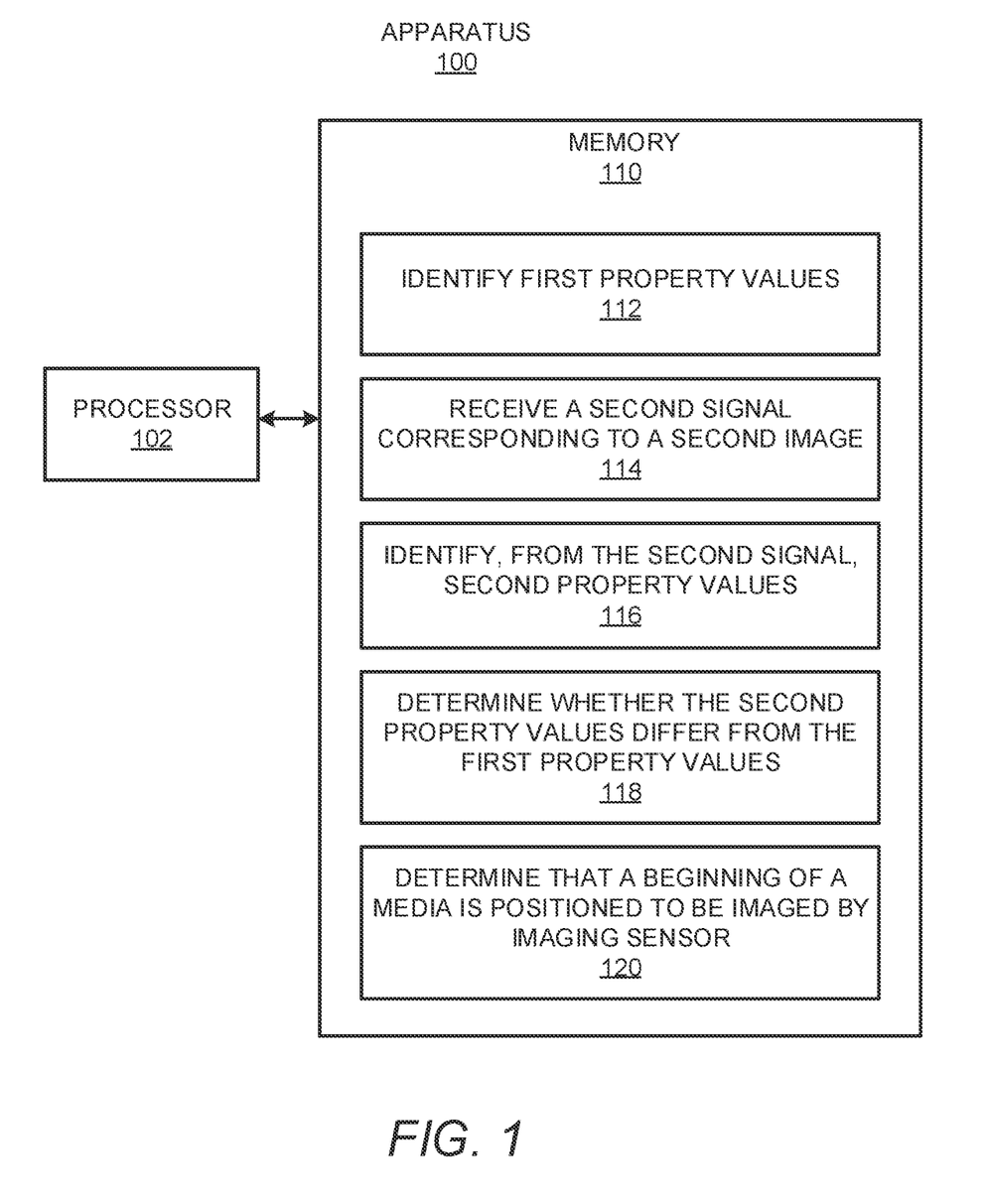
FIG. 1 depicts a block diagram of an example apparatus that may determine that a media is positioned to be imaged by an imaging sensor.
Figure 2:
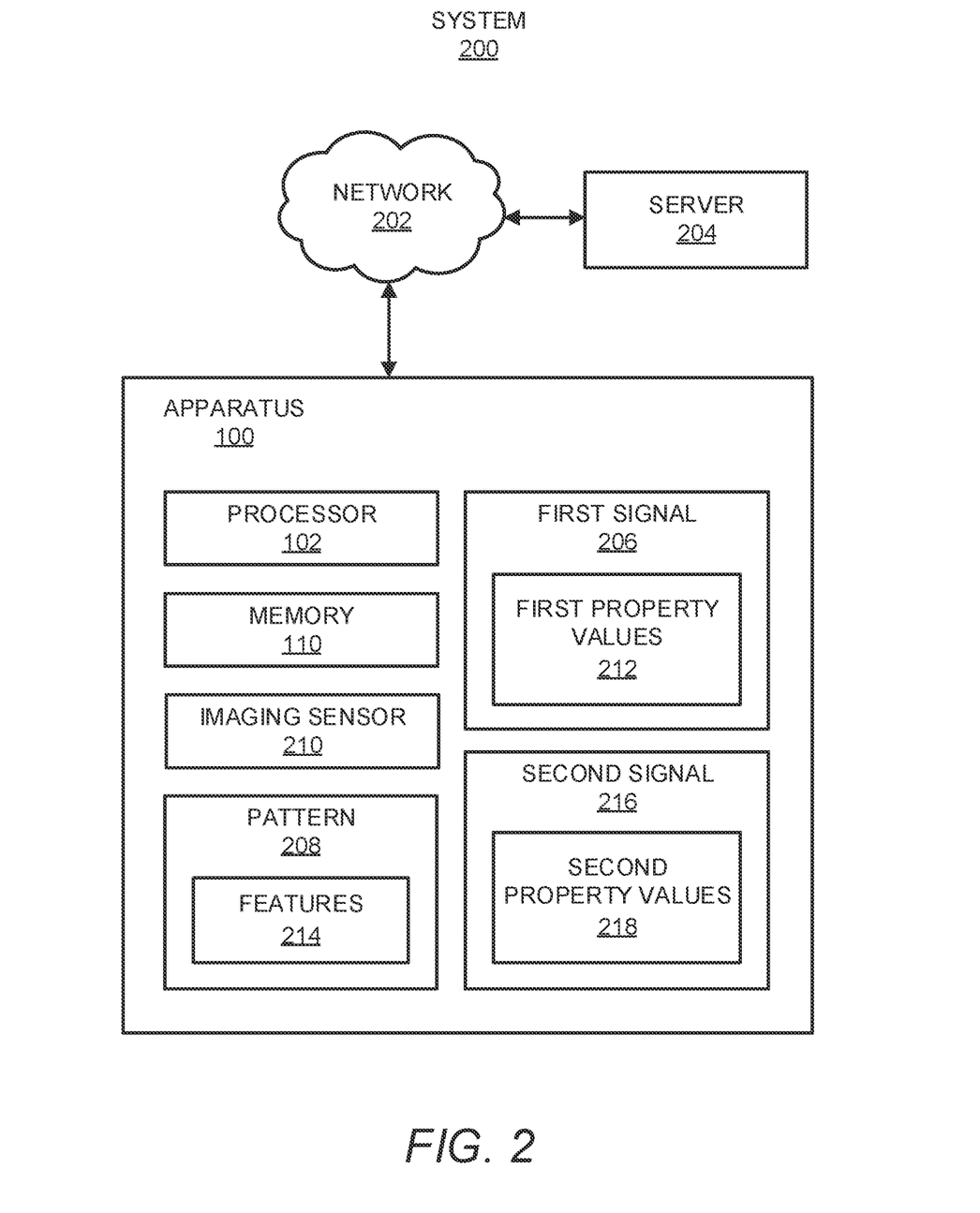
FIG. 2 depicts a block diagram of an example system within which the example apparatus depicted in FIG. 1 may be implemented.
Figure 3A:
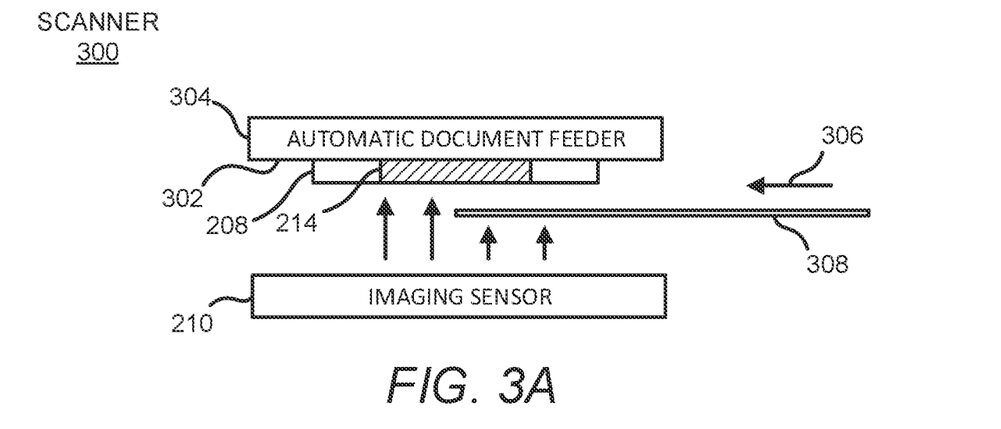
FIGS. 3A and 3B depict diagrams of an example scanner that the processor in the example apparatus depicted in FIGS. 1 and 2 may manage.
Figure 3B:
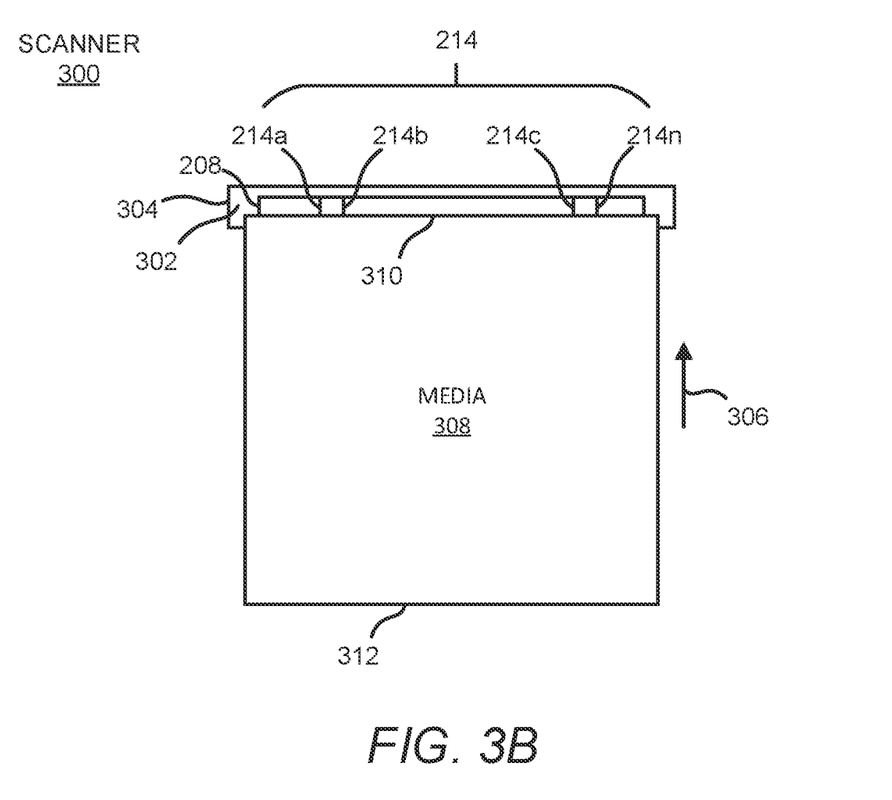
Figure 4:
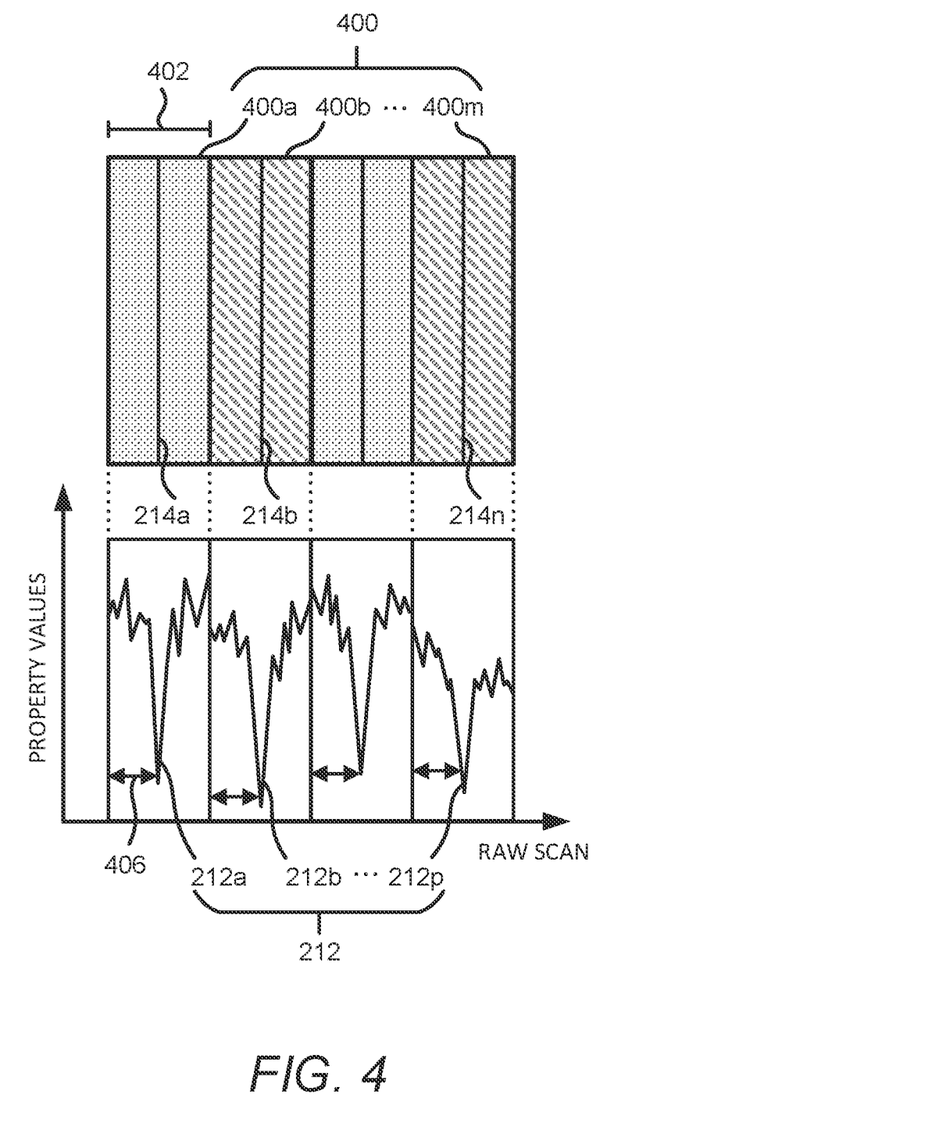
FIG. 4 depicts a diagram of example scan windows correlating to respective positions of a plurality of features included in a pattern and an example graph of property values that may correlate to the scan windows.
Figure 5:
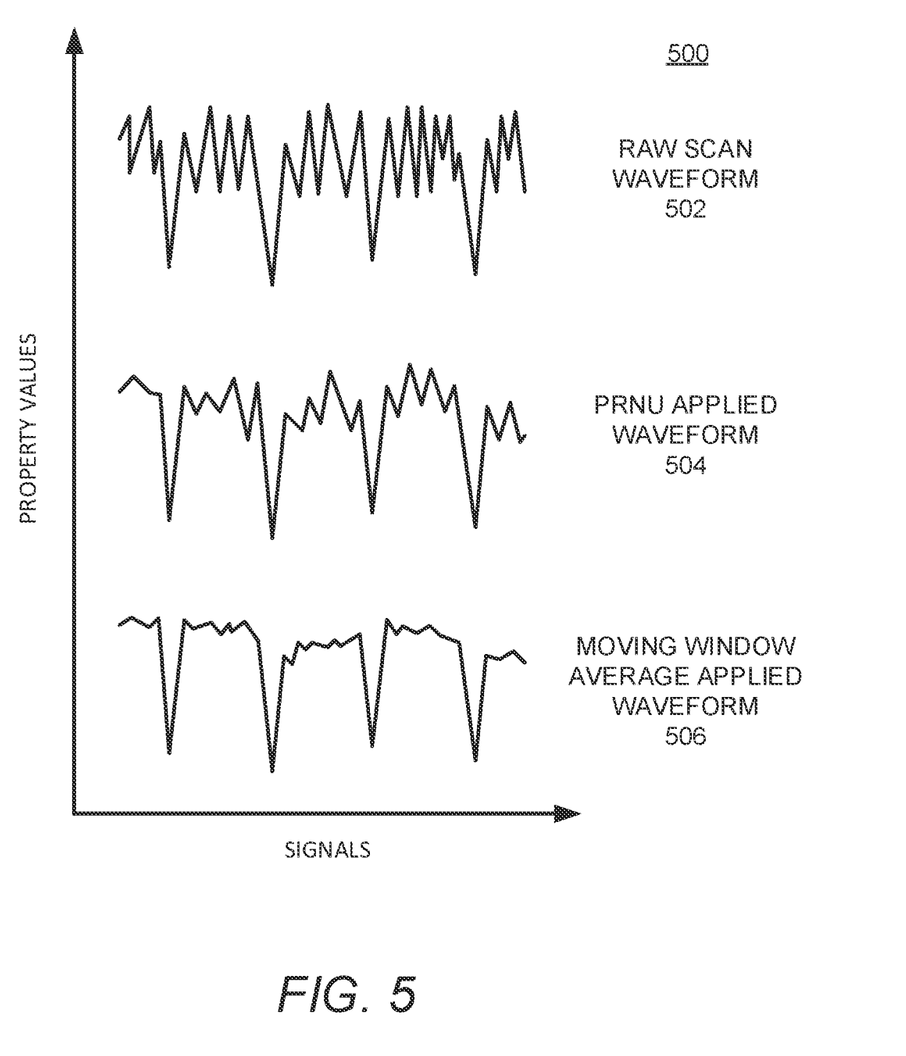
FIG. 5 depicts a graph of example waveforms of property values according to different types of signal processing, including a raw scan signal waveform, a photo-response non-uniformity processed waveform, and a moving window average applied waveform.

Reference is made to FIGS. 1, 2, 3A, 3B, 4, and 5. FIG. 1 depicts a block diagram of an example apparatus 100 that may determine that a media is positioned to be imaged by an imaging sensor. FIG. 2 depicts a block diagram of an example system 200 within which the example apparatus 100 depicted in FIG. 1 may be implemented. FIGS. 3A and 3B depict diagrams of an example scanner 300 that the processor in the example apparatus 100 depicted in FIGS. 1 and 2 may manage. FIG. 4 depicts a diagram of example scan windows 400 correlating to respective positions of a plurality of features included in a pattern and an example graph of property values that may correlate to the scan windows 400. FIG. 5 depicts a graph of example waveforms 500 of property values according to different types of signal processing, including a raw scan signal waveform, a photo-response non-uniformity processed waveform, and a moving window average applied waveform. It should be understood that the apparatus 100 depicted in FIG. 1, the system 200 depicted in FIG. 2, the scanner 300 depicted in FIGS. 3A and 3B, the scan windows 400 depicted in FIG. 4, and waveforms 500 depicted in FIG. 5 may include additional features and that some of the features described herein may be removed and/or modified without departing from the scopes of the apparatus 100, the system 200, the scanner 300, the scan windows 400, and/or the waveforms 500.

In some examples, the apparatus 100 may be implemented in a scanner, an ADF of a scanner, a printer (such as an inkjet printer, a laser printer, a photo printer, or the like), a computing device, and/or the like. As shown, the apparatus 100 may include a processor 102 and a non-transitory computer-readable medium, e.g., a memory 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100 and/or system 200. In this regard, references to a single processor 102 as well as to a single memory 110 may be understood to additionally or alternatively pertain to multiple processors 102 and/or multiple memories 110. As depicted in FIG. 2, the apparatus 100 may be implemented in a system 200, which may include a server 204 with which the apparatus 100 may be in communication via a network 202.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-120 to determine a presence of a media relative to an imaging sensor. The instructions 112-120 may be computer-readable instructions, e.g., non-transitory computer-readable instructions. In other examples, the apparatus 100 may include hardware logic blocks or a combination of instructions and hardware logic blocks to implement or execute functions corresponding to the instructions 112-120.

In some examples, the processor 102 may calibrate for a pattern 208 based on a first signal 206 corresponding to an image of the pattern 208. The processor 102 may receive the first signal 206 corresponding to the image of the pattern 208 captured by an imaging sensor 210. In some examples, the pattern 208 may be a printed pattern that may be applied to a surface 302 of a scanner 300, a molded pattern that may be formed integrally on the surface 302, and/or the like. As depicted in FIG. 3A, the pattern 208 may be positioned at a spaced relation with respect to the imaging sensor 210. By way of particular example and for purposes of illustration, an ADF 304 may be positioned adjacent to the imaging sensor 210 such that the imaging sensors 210 may be aligned to face a surface 302 of the ADF 304. The ADF 304 may have a white background, which may provide relatively higher contrast for the pattern 208. In this example, the pattern 208 may be applied to the surface 302 on the ADF 304, such as a surface of a scroll bar, such that the imaging sensor 210 may capture an image of the pattern 208. In this regard, the scroll bar may be a device that aids in proper scanning of the media 308, for instance, by applying pressure to the media 308 against a glass that may be positioned over the imaging sensor 210. The scroll bar may also be referred to as a pressure bar.

By way of particular example and for purposes of illustration, the pattern 208 may include a pattern of features 214. In some examples, the features 214 may extend along a scan direction in which the media 308 may be fed, as depicted by the arrow 306 in FIG. 3B. The features 214 may be arranged to be parallel to the scan direction 306. Alternatively or additionally, the features 214 may be arranged at predetermined angles relative to the scan direction 306.

The pattern 208 may include a plurality of features 214*a* to 214*n* as depicted in FIG. 3B, in which the variable "n" may represent a value greater than one. In some examples, the features 214 may be arranged in pairs, such as the pair of features, e.g., lines, 214*a* and 214*b* and the pair of features, e.g., lines, 214*c* and 214*n*. The features 214*a* to 214*n* in the pattern 208 may be positioned at predetermined distances relative to each other. In some examples, the pattern 208 may include a single feature 214*a*.

The features 214 may have a predetermined color. By way of particular example and for purposes of illustration, the features 214 may be CIE L*a*b* controlled grey line pairs. In these instances, the features 214 may have a predetermined level of gray. The predetermined color of the features 214 may be determined to prevent bleed-through, for instance, in cases where the media 308 is positioned over the features 214 to block the features 214 from view of the imaging sensor 210. In some examples, the surface 302 of the scanner 300 to which the pattern 208 is applied may have a predetermined color that may provide sufficient contrast to the color of the features 214. In some examples, the surface 302 of the scanner 300 may be white and may provide a white background for the pattern 208. It should be understood that, while the pattern 208 is described in the present disclosure as being a pattern of grey line pairs, the pattern 208 may include various types of patterns, which may be formed using different shapes, colors, characteristics, and/or the like.

The processor 102 may fetch, decode, and execute the instructions 112 to identify first property values 212 along the image of the pattern 208. The first property values 212 may be based on a first signal 206 corresponding to the image of the pattern 208. In some examples, the processor 102 may identify the first property values 212 based on the first signal 206 received from the imaging sensor 210. Alternatively or additionally, the processor 102 may identify the first property values 212 based on information stored on the memory 110, the server 204, and/or the like, corresponding to the image of the pattern 208 captured by the imaging sensor 210. The first property values 212 may be values of certain properties associated with the features 214 in the pattern 208 of the captured image. As such, the first property values 212 may be used to generate learned data, which may form reference values for a property of the features 214 for later comparison with other received signals. In some examples, the first property values 212 may be grey levels along the image of the pattern 208, which may be identified from the first signal 206. It should be understood that, while grey levels are used herein as an example for purposes of description, other types of properties of the captured image may be used.

In some examples, in order to identify the first property values 212, the processor 102 may identify scan windows in the first signal 206, such as scan windows 400 depicted in FIG. 4. The processor 102 may analyze data from portions of the first signal 206 corresponding to the identified scan windows 400 rather than the entire first signal 206, which may reduce the load on processing resources and improve the efficiency and speed in processing the first signal 206.

The scan windows 400 may include a plurality of scan windows 400a to 400m, in which the variable may represent a value greater than one. Each of the scan windows 400a to 400m may correlate to respective positions of the plurality of features 214a to 214n included in the pattern 208. For instance, each of the scan windows 400a to 400m may be sections of the first signal 206 correlating to respective positions of the plurality of features 214a to 214n included in the pattern 208. The processor 102 may extract a section of the first signal 206 as a corresponding scan window 400a to 400m for further processing. The first property values 212 may include peak values within respective scan windows 400a to 400m corresponding to areas around the plurality of features 214a to 214n in the pattern 208.

Each scan window 400a to 400m may have a predetermined width 402. In some examples, the imaging sensor 210 may be made up of a series of sensors, each of which may correlate with a pixel in the captured image. The processor 102 may identify groups of the sensors, correlated to areas around the features 214a to 214n, according to the predetermined width 402 of the scan windows 400a to 400m. By way of particular example and for purposes of illustration, the predetermined width 402 of the scan windows 400a to 400m may be 40 pixels wide, and the processor 102 may identify 40 pixels centered around respective features 214a to 214n in the respective scan windows 400a to 400m. The widths of the scan windows 400 may be user-defined, or may be based on testing, modeling, simulations, and/or the like.

In some examples, the processor 102 may adjust positions of the identified scan windows 400a to 400m to center the identified scan windows 400a to 400m on peak values of the first property values 212a to 212p correlated to respective features 214a to 214n of the plurality of features 214. The processor 102 may adjust the positions of the identified scan windows 400a to 400m based on the relative positions of each of the identified scan windows 400a to 400m to each other.

In this regard, the position of the pattern 208 may shift or change in the scanner 300. That is, the position of the pattern 208 relative to a position of the imaging sensor 210 may not be fixed and may shift from scan job to scan job, for instance, due to lateral mechanical movements of the scanner components. As such, the processor 102 may calibrate the positions of the scan windows 400a to 400m to correlate with the positions of the features 214a to 214n. In some examples, the absolute positions of the peaks of the first property values 212 in each of the scan windows 400a to 400m may be individually calibrated throughout the scan job. However, such methods to individually calibrate positions of each scan window 400a to 400m may be processing resource intensive and time consuming.

As such, in some examples, the processor 102 may adjust the positions of the identified scan windows 400a to 400m based on relative positions of each of the identified scan windows 400a to 400m to each other. For instance, since the distances between each of the features 214a to 214n in the pattern 208 may be predetermined and known, the processor 102 may determine a position error for one scan window 400a and may apply the determined position error to the remaining scan windows 400b to 400m based on the known relative positions of each of the scan windows 400a to 400m. By way of particular example, based on a determination that the distance 406 of the peak of the first property value 212a should be increased by 10 pixels, the processor 102 may shift each of the scan windows 400a to 400m by 10 pixels from their respective relative positions to each other.

In some examples, the processor 102 may process the first signal 206 to improve a quality of a waveform 500 of the first signal 206 prior to using the first signal 206 to identify the first property values 212. The processor 102 may apply a photo response non-uniformity (PRNU) algorithm, a horizontal moving window average (MWA) algorithm, a vertical MWA algorithm, and/or the like. PRNU may describe a gain or ratio between optical power on a pixel versus an electrical signal output, and may address differences in sensitivity of individual sensors that make up the imaging sensor 210. By way of particular example, in some instances, PRNU compensation may be applied to raw scan data in hardware within an ASIC. However, in cases where the data for media detection is available before the hardware component in which PRNU compensation may be performed, PRNU may be applied in firmware. In some examples, the processor 102 may apply the PRNU algorithm to process the first signal 206 to compensate for the differences in sensitivity of the individual sensors in the imaging sensor 210. As depicted in FIG. 5, the processor 102 may apply the PRNU algorithm to a raw scan waveform 502, such as the incoming first signal 206, to generate a PRNU applied waveform 504.

The processor 102 may apply horizontal MWA and vertical MWA to the PRNU applied waveform 504 to further compensate the first signal 206 to generate the MWA applied waveform 506, as depicted in FIG. 5. In this regard, the horizontal MWA may help to smooth out the first signal 206, and the vertical MWA may help to remove glitches in the signal, such as due to electro-static discharge (ESD). The processor 102 may use the compensated waveforms to determine the peaks in the first property values 212a to 212p, which may improve the accuracy and reliability of the peak value detection.

In the present disclosure, the initial processes to generate the learned data, which may define baseline values of the first property values 212 used for comparison at later phases, may be referred to as the learning phase. Once the peak values of the first property values 212 in the scan windows 400 are determined, the processor 102 may apply additional algorithms in the learning phase to improve the accuracy and the reliability of the first property values 212. These algorithms may include identification of skip windows, average of N samples, and generation of learned data for use as a reference set of values for the first property values 212.

As to identification of skip windows, in some examples, dust may accumulate in any of the scan windows 400, which may result in inaccurate detection of peaks in the first property values 212. To protect against such errors, the processor 102 may identify as a skip window any scan window that has a relatively high difference in the position of the peak as compared to other scan windows 400. The processor 102 may skip over such identified scan windows during processing in the learning phase.

As to average of N samples, the processor 102 may generate the learned data for the first property values 212 based on an averaged output of a predetermined number of scan lines from the imaging sensor 210. As such, the processor 102 may avoid potential errors associated with using only one scan line during the learning phase.

As to generation of learn data, the processor 102 may generate the learned data for the first property values 212 based on the positions of peaks and peak values of the first property values 212, such as the grey levels at the peaks. The processor 102 may store the learned data for the first property values 212 for comparison with data identified during a scanning phase. In the present disclosure, the period that occurs after the learning phase, during which the media 308 is scanned, may be referred to as the scanning phase.

The processor 102 may identify the first property values 212 during the learning phase, prior to initiation of a scan job to scan the media 308. In some examples, the processor 102 may identify the first property values 212 at predetermined times, for instance, prior to each scan job, prior to each instance that the media 308 reaches the imaging sensor 210, and/or at predetermined intervals prior to scan jobs, such as every second, minute, day, and/or the like. In instances in which the processor 102 identifies the first property values 212 at predetermined intervals prior to scan jobs, the first property values 212 may be stored in the memory 110 at the apparatus 100, on the server 204, and/or the like, and may be retrieved during the scanning phase for media detection.

The processor 102 may fetch, decode, and execute the instructions 114 to receive a second signal 216 corresponding to a second image captured by the imaging sensor 210. The second signal 216 may be a signal received during the scanning phase. The processor 102 may begin receiving the second signal 216 before the media 308 reaches the imaging sensor 210. In some examples, the processor 102 may continuously receive the second signal 216 beginning prior to the media 308 reaching the imaging sensor 210, and continuing until after the media 308 is determined to have passed the imaging sensor 210.

The processor 102 may fetch, decode, and execute the instructions 116 to identify, from the second signal 216, second property values 218 along the second image. The second image may be an image captured by the imaging sensor 210 at the same location as the first image for the first signal 206. The processor 102 may determine whether the second signal 216 includes the second property values 218 along the second image. The processor 102 may determine peak values of the second property values 218. The process to detect the peak values of the second property values 218 may be the same as to detect the peak values in the first property values 212, as previously described. For instance, to process the second signal 216, the processor 102 may identify scan windows, apply a PRNU algorithm, and/or apply a horizontal MWA and a vertical MWA, as previously described with respect to the first signal 206.

The processor 102 may fetch, decode, and execute the instructions 118 to determine whether the second property values 218 differ from the first property values 212. In this regard, the processor 102 may compare the relative positions and/or peak values of the second property values 218 with the relative positions and/or peak values of the first property values 212 determined during the learning phase. In some examples, the processor 102 may determine whether the second property value 218 is within predetermined thresholds for the relative positions and/or the peak values compared to those of the first property values 212. Based on the comparison of the second property values 218 and the first property values 212, the processor 102 may determine whether the media 308 is positioned to be scanned by the imaging sensor 210, for instance, in a "media present" state, or whether the media 308 is not positioned to be scanned by the imaging sensor 210, for instance, in a "media not present" state.

In this regard, based on a determination that the second property values 218 include second positions and/or peak values that match the positions and/or peak values of the first property values 212, the processor 102 may determine that the media 308 is not positioned to be imaged by the imaging sensor 210, as media 308 may not be blocking the pattern 208 applied to the surface 302 of the scanner 300. Alternatively, based on a determination that the second positions and/or peak values of the second property values 218 do not match positions and/or peak values of the first property values 212, the processor 102 may determine that the media 308 is present, as the media 308 may be blocking the pattern 208 from the imaging sensor 210.

The processor 102 may fetch, decode, and execute the instructions 120 to determine that a beginning 310 (e.g., top) of a media 308 may be positioned to be imaged by the imaging sensor 210 based on a determination that the second property values 218 differ from the first property values 212. In some examples, the processor 102 may determine that the beginning 310 of the media 308 has reached a position to be scanned by the imaging sensor 210 based on a transition from the "media present" state to the "media not present" state. In some examples, based on a determination that the media 308 is positioned to be imaged by the imaging sensor 210, the processor 102 may output an instruction, for instance, to the imaging sensor 210, an imaging subsystem (not shown), and/or the like, to begin scanning the media 308.

The processor 102 may apply filters to reduce a number of false positive triggers for media detection. In some examples, dust accumulation in the scanner 300 may trigger false detection of the beginning 310 of the media 308, in which case the processor 102 may incorrectly detect a non-match state between the second property value 218 and the first property value 212. In these instances, the processor 102 may apply a dust filter, in which the processor 102 may identify a predetermined number of scan windows 400 that fail the matching condition before the processor 102 makes a determination that a transition has occurred from a "media not present" state to a "media present" state. As such, the processor 102 may reduce a number of occurrences of false detections of the beginning 310 of the media, which may be caused by dust accumulation. In some examples, the processor 102 may apply a skip window filter, in which the scan windows 400 identified as skip windows, for instance in the learning phase as previously described, may be skipped over in subsequent scanning phases.

In some examples, the processor 102 may detect an end 312 (e.g., bottom) of the media 308. The processor 102 may determine third property values (not shown) corresponding to a third image captured by the imaging sensor 210. The processor 102 may determine whether the third property values match the first property values 212, identified during the learning phase. In some examples, the processor 102 may determine whether a position and/or a peak value of the third property values correlating to the scan windows 400 match the position and/or peak values of the first property values 212. In this regard, when the third property values match the first property values, the processor 102 may determine that a transition has occurred from the "media present" state to the "media not present" state. Based on the third property values matching the first property values 212, the processor 102 may determine that an end 312 of the media 308 has passed the imaging sensor 210. In some examples, based on a determination that the end 312 of the media 308 has passed the imaging sensor 210, the processor 102 may output an instruction, for instance, to the imaging sensor 210, an imaging subsystem, and/or the like, to stop scanning the media 308.

In some examples, the processor 102 may apply a decision glitch filter, which may filter false determinations that the end 312 of the media 308 has passed the imaging sensor 210. For instance, determinations based on samples from a relatively small number of scan lines may increase changes for false positives. As such, the processor 102 may make the determination that the end 312 of the media 308 has passed the imaging sensor 210 based on data from a predetermined number of scan lines.

Figure 6:
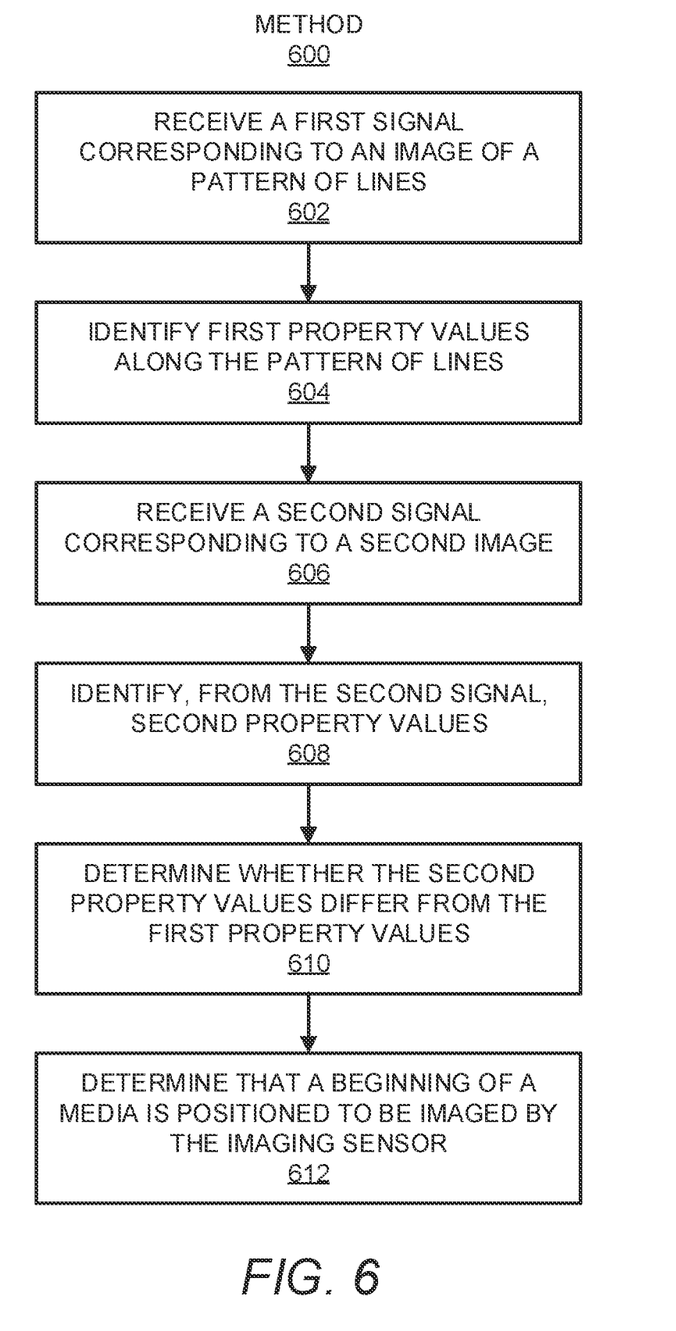
FIG. 6 depicts a flow diagram of an example method for receiving a signal corresponding to an image of a pattern of features captured by an imaging sensor and, based on property values along the pattern of features identified in the received signal, determine that a media may be positioned to be imaged by the imaging sensor.

Various manners in which the processor 102 may operate are discussed in greater detail with respect to the method 600 depicted in FIG. 6. FIG. 6 depicts a flow diagram of an example method 600 for receiving a signal corresponding to an image of a pattern 208 of features 214 captured by an imaging sensor 210 and, based on property values along the pattern of features 214 identified in the received signal, determine that a media 308 may be positioned to be imaged by the imaging sensor 210. It should be understood that the method 600 depicted in FIG. 6 may include additional operations and that some of the operations described therein may be removed and/or modified without departing from the scope of the method 600. The description of the method 600 is made with reference to the features depicted in FIGS. 1, 2, 3A, 3B, 4, and 5 for purposes of illustration.

At block 602, the processor 102 may receive a first signal 206 corresponding to an image of a pattern 208 of features 214, for instance, as depicted in FIGS. 2 to 3B, captured by an imaging sensor 210. The pattern 208 of features 214 may be positioned at a spaced relation with respect to the imaging sensor 210 and the features 214 in the pattern 208 of features 214 may be positioned at predetermined distances relative to each other. At block 604, the processor 102 may identify first property values 212 along the pattern 208 of features 214.

At block 606, the processor 102 may receive a second signal corresponding to a second image captured by the imaging sensor. At block 608, the processor 102 may identify, from the second signal 216, second property values 218 along the second image.

At block 610, the processor 102 may determine whether the second property values 218 differ from the first property values 212. At block 612, based on a determination that the second property values 218 differ from the first property values 212, the processor 102 may determine that a beginning 310 of a media 308 may be positioned to be imaged by the imaging sensor 210.

In some examples, the processor 102 may identify scan windows 400 in the first signal 206. The identified scan windows 400 may be sections of the first signal 206 correlating to respective positions of a plurality of features included in the pattern 208 of features 214. The processor 102 may adjust positions of the identified scan windows 400 to center the identified scan windows 400 on peak values of the first property values 212 correlated to the plurality of features in the pattern 208 of features 214. The positions of the identified scan windows 400 may be adjusted based on relative positions of each of the identified scan windows 400 to each other.

The processor 102 may determine a presence of the media 308 relative to the imaging sensor 210 based on comparison of the first property values 212 and the second property values 218. Based on a determination that the media 308 is positioned to be imaged by the imaging sensor 210, the processor 102 may output an instruction, for instance, to the imaging sensor 210, an imaging subsystem, and/or the like, to begin scanning the media 308.

The processor 102 may determine third property values (not shown) corresponding to a third image captured by the imaging sensor 210. The processor 102 may receive a third signal for the third image after detection of the beginning 310 of the media 308. The processor 102 may determine whether the third property values match the first property values 212.

Based on the third property values matching the first property values 212, the processor 102 may determine that an end 312 of the media 308 has passed the imaging sensor 210. In some examples, based on a determination that the end 312 of the media 308 has passed the imaging sensor 210, the processor 102 may output an instruction, for instance, to the imaging sensor 210, an imaging subsystem, and/or the like, to stop scanning the media 308.

Some or all of the operations set forth in the method 600 may be included as utilities, programs, or subprograms, in any desired computer accessible medium. In addition, the method 600 may be embodied by computer programs, which may exist in a variety of forms both active and inactive. For example, they may exist as computer-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 7:
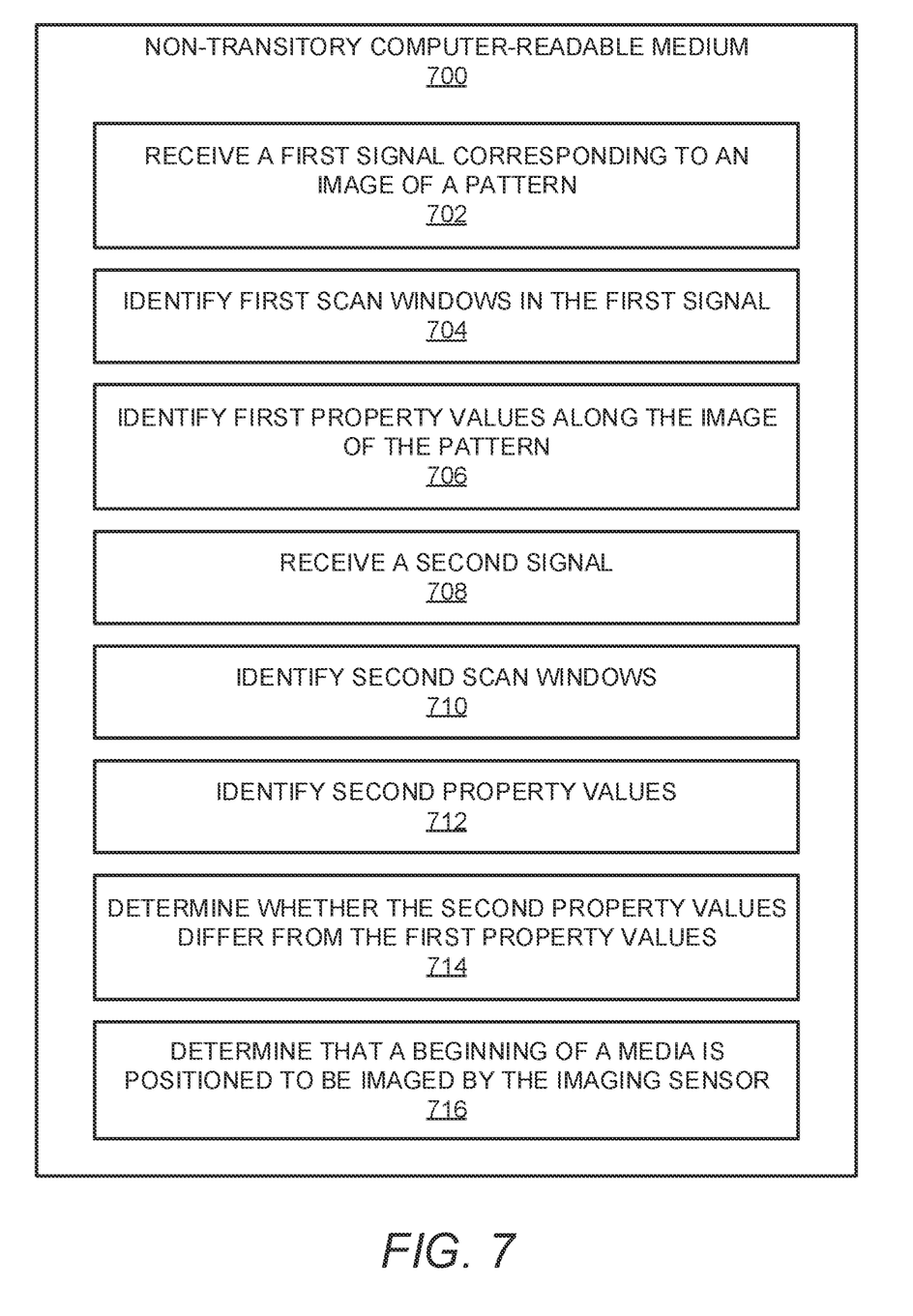
FIG. 7 depicts a block diagram of an example non-transitory computer-readable medium that may have stored thereon computer-readable instructions to receive a signal corresponding to an image of a pattern captured by an imaging sensor, identify scan windows in the received signal, and, based on property values along the image of the pattern in the identified scan windows, determine that a media is positioned to be imaged by the imaging sensor.

Turning now to FIG. 7, there is shown a block diagram of a non-transitory computer-readable medium 700 that may have stored thereon computer-readable instructions to receive a signal corresponding to an image of a pattern 208 captured by an imaging sensor 210, identify scan windows 400 in the received signal, and, based on property values along the image of the pattern 208 in the identified scan windows 400, determine that a media 308 is positioned to be imaged by the imaging sensor 210. It should be understood that the computer-readable medium 700 depicted in FIG. 7 may include additional instructions and that some of the instructions described herein may be removed and/or modified without departing from the scope of the computer-readable medium 700 disclosed herein. The computer-readable medium 700 may be a non-transitory computer-readable medium. The term "non-transitory" does not encompass transitory propagating signals.

The computer-readable medium 700 may have stored thereon computer-readable instructions 702-716 that a processor, such as the processor 102 depicted in FIGS. 1-2, may execute. The computer-readable medium 700 may be an electronic, magnetic, optical, or other physical storage device that contains or stores executable instructions. The computer-readable medium 700 may be, for example, Random-Access memory (RAM), an Electrically Erasable Programmable Read-Only Memory (EEPROM), a storage device, an optical disc, or the like.

The processor may fetch, decode, and execute the instructions 702 to receive a first signal 206 corresponding to an image of a pattern 208 captured by an imaging sensor 210. The pattern 208 may be positioned at a spaced relation with respect to the imaging sensor 210 as discussed herein.

The processor may fetch, decode, and execute the instructions 704 to identify first scan windows, such as the scan windows 400 depicted in FIG. 4, in the first signal 206. The first scan windows may be sections of the first signal 206 correlating to respective positions of objects included in the pattern 208.

The processor may fetch, decode, and execute the instructions 706 may identify, from the first signal 206 in the first scan windows, first property values 212 along the image of the pattern 208.

The processor may fetch, decode, and execute the instructions 708 to receive a second signal 216 corresponding to a second image captured by the imaging sensor 210. The processor may fetch, decode, and execute the instructions 710 to identify second scan windows, such as the scan windows 400 depicted in FIG. 4, in the second signal 216. The second scan windows may be sections of the second signal 216 correlating to the respective positions of the objects included in the pattern 208.

The processor may fetch, decode, and execute the instructions 712 to identify, from the second signal 216 in the second scan windows, second property values 218 along the second image. In some examples, the first signal 206 may be received during a learning phase prior to scanning, and the second signal 216 may be received during a scanning phase, which may occur after the learning phase. In some examples, the scanning phase may include periods before and after the imaging sensor 210 is controlled to scan the media 308.

The processor may fetch, decode, and execute the instructions 714 to determine whether the second property values 218 differ from the first property values 212. Based on a determination that the second property values 218 differ from the first property values 212, the processor may determine that a beginning 310 of the media 308 may be positioned to be imaged by the imaging sensor 210.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. Requires a scanner comprising the following:
    an imaging sensor;
    a surface having a pattern positioned at a spaced relation with respect to the imaging sensor;
    a processor, and
    a memory on which are stored machine-readable instructions that when executed by the processor, cause the processor to:
        identify first property values along an image of the pattern based on a first signal corresponding to an image of the pattern captured by and received from the imaging sensor;
        receive a second signal corresponding to a second image captured by the imaging sensor;
        identify, from the second signal, second property values along the second image;
        determine whether the second property values differ from the first property values; and
        based on a determination that the second property values differ from the first property values, determine that a beginning of a media is positioned to be imaged by the imaging sensor.

2. The scanner of claim 1, wherein the pattern is applied to or formed on the surface of the scanner.

3. The scanner of claim 1, wherein the pattern comprises a pattern of features that extend along a scan direction at which the media is to be fed, the features in the pattern of features being positioned at predetermined distances relative to each other.

4. The scanner of claim 1, wherein the instructions cause the processor to:
    identify scan windows in the first signal, the identified scan windows being sections of the first signal correlating to respective positions of a plurality of features included in the pattern; and
    adjust positions of the identified scan windows to center the identified scan windows on peak values of the first property values correlated to respective features of the plurality of features, the positions of the identified scan windows being adjusted based on relative positions of each of the identified scan windows to each other.

5. The scanner of claim 1, wherein the first property values comprise first peak values within respective scan windows corresponding to areas around features in the pattern and wherein the instructions cause the processor to:
    determine whether the second property values comprise second peak values that match the first peak values; and determine that the media is not positioned to be imaged by the imaging sensor based on the second peak values matching the first peak values.

6. The scanner of claim 1, wherein the instructions cause the processor to:
based on a determination that the media is positioned to be imaged by the imaging sensor, output an instruction to begin scanning the media.

7. The scanner of claim 6, wherein the instructions cause the processor to:
determine third property values corresponding to a third image captured by the imaging sensor;
determine whether the third property values match the first property values;
based on the third property values matching the first property values, determine that an end of the media has passed the imaging sensor; and
based on a determination that the end of the media has passed the imaging sensor, output an instruction to stop scanning the media.

8. A method comprising:
receiving, by a processor, a first signal corresponding to an image of a pattern of features captured by an imaging sensor, the pattern of features being positioned at a spaced relation with respect to the imaging sensor and the features in the pattern of features being positioned at predetermined distances relative to each other;
identifying, by the processor, first property values along the pattern of features;
receiving, by the processor, a second signal corresponding to a second image captured by the imaging sensor;
identifying, by the processor, from the second signal, second property values along the second image;
determining, by the processor, whether the second property values differ from the first property values; and
based on a determination that the second property values differ from the first property values, determining, by the processor, that a beginning of a media is positioned to be imaged by the imaging sensor.

9. The method of claim 8, further comprising:
identifying scan windows in the first signal, the identified scan windows being sections of the first signal correlating to respective positions of a plurality of features included in the pattern of features; and
adjusting positions of the identified scan windows to center the identified scan windows on peak values of the first property values correlated to the plurality of features in the pattern of features, the positions of the identified scan windows being adjusted based on relative positions of each of the identified scan windows to each other.

10. The method of claim 8, further comprising:
based on a determination that the media is positioned to be imaged by the imaging sensor, output an instruction to begin scanning the media.

11. The method of claim 8, further comprising:
determining third property values corresponding to a third image captured by the imaging sensor;
determining whether the third property values match the first property values;
based on the third property values matching the first property values, determining that an end of the media has passed the imaging sensor; and
based on a determination that the end of the media has passed the imaging sensor, outputting an instruction to the imaging sensor to stop scanning the media.

12. A non-transitory computer readable medium on which is stored machine readable instructions that, when executed by a processor, cause the processor to:
receive a first signal corresponding to an image of a pattern captured by an imaging sensor, the pattern being positioned at a spaced relation with respect to the imaging sensor;
identify first scan windows in the first signal, the first scan windows being sections of the first signal correlating to respective positions of objects included in the pattern;
identify, from the first signal in the first scan windows, first property values along the image of the pattern;
receive a second signal corresponding to a second image captured by the imaging sensor;
identify second scan windows in the second signal, the second scan windows being sections of the second signal correlating to the respective positions of the objects included in the pattern;
identify, from the second signal in the second scan windows, second property values along the second image;
determine whether the second property values differ from the first property values; and
based on a determination that the second property values differ from the first property values, determine that a beginning of a media is positioned to be imaged by the imaging sensor.

13. The non-transitory computer readable medium of claim 12, wherein the instructions cause the processor to:
adjust positions of the first scan windows to center the first scan windows on peak values of the first property values correlated to the objects included in the pattern, the positions of the first scan windows being adjusted based on relative positions of each of the first scan windows to each other.

14. The non-transitory computer readable medium of claim 12, wherein the instructions cause the processor to:
based on a determination that the media is positioned to be imaged by the imaging sensor, output an instruction to begin scanning the media.

15. The non-transitory computer readable medium of claim 12, wherein the instructions cause the processor to:
determine third property values corresponding to a third image captured by the imaging sensor;
determine whether the third property values match the first property values;
based on the third property values matching the first property values, determine that an end of the media has passed the imaging sensor; and
based on a determination that the end of the media has passed the imaging sensor, output an instruction to stop scanning the media.

* * * * *